United States Patent
Tashiro et al.

(10) Patent No.: US 9,822,660 B2
(45) Date of Patent: Nov. 21, 2017

(54) STOPPER STRUCTURE FOR REGULATING OPENING DEGREE OF NOZZLE VANE IN TURBOCHARGER

(75) Inventors: Naoto Tashiro, Tokyo (JP); Yasuaki Jinnai, Tokyo (JP); Hiroyuki Arimizu, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 892 days.

(21) Appl. No.: 14/232,554

(22) PCT Filed: Sep. 7, 2012

(86) PCT No.: PCT/JP2012/072889
§ 371 (c)(1),
(2), (4) Date: Feb. 7, 2014

(87) PCT Pub. No.: WO2013/047155
PCT Pub. Date: Apr. 4, 2013

(65) Prior Publication Data
US 2014/0169949 A1    Jun. 19, 2014

(30) Foreign Application Priority Data

Sep. 28, 2011  (JP) .................................. 2011-213555

(51) Int. Cl.
F04D 29/44  (2006.01)
F01D 17/16  (2006.01)
F02B 37/24  (2006.01)

(52) U.S. Cl.
CPC ........... F01D 17/16 (2013.01); F01D 17/165 (2013.01); F02B 37/24 (2013.01);
(Continued)

(58) Field of Classification Search
CPC ...... F01D 17/16; F01D 17/167; F01D 17/165; F02B 37/24
(Continued)

(56) References Cited

U.S. PATENT DOCUMENTS 4,770,603 A * 9/1988 Engels .................... F01D 5/141
                                                        415/147
4,780,054 A * 10/1988 Yano ..................... F01D 17/165
                                                        415/150
(Continued)

FOREIGN PATENT DOCUMENTS

CN  1625646 A   6/2005
CN  101302942 A  11/2008
(Continued)

OTHER PUBLICATIONS

Extended European Search Report effective May 27, 2016 issued in corresponding EP Application No. 16156139.4.
(Continued)

*Primary Examiner* — Craig Kim
*Assistant Examiner* — Jason Fountain
(74) *Attorney, Agent, or Firm* — Birch, Stewart, Kolasch & Birch LLP

(57) ABSTRACT

A stopper 30 is provided with: a nut-receiving part 44a provided on a heat insulation plate 44 that is attached to an actuator bracket 43; and a movable-side stopper part 33 provided on an actuator rod 26 that moves in relation to the heat insulation plate 44. An actuator 27 is provided with an actuator body 41 that generates driving force, and the actuator rod 26 which transmits the driving force from the actuator body 41. The movable-side stopper part 33 is provided on the actuator rod 26 that extends from the actuator body 41 to the nozzle vane side.

7 Claims, 6 Drawing Sheets

(52) U.S. Cl.
CPC ...... *F05D 2220/40* (2013.01); *F05D 2240/91* (2013.01); *F05D 2260/30* (2013.01); *F05D 2260/50* (2013.01); *Y02T 10/144* (2013.01)

(58) Field of Classification Search
USPC ............................................ 415/185; 74/469
See application file for complete search history.

(56) References Cited

U.S. PATENT DOCUMENTS

| | | | | |
|---|---|---|---|---|
| 4,927,325 | A * | 5/1990 | Yano | F01D 17/165 |
| | | | | 415/161 |
| 6,397,597 | B1 * | 6/2002 | Gartner | F01D 17/165 |
| | | | | 123/568.12 |
| 6,409,483 | B2 * | 6/2002 | Jinnai | F01D 17/165 |
| | | | | 415/150 |
| 8,020,381 | B2 * | 9/2011 | Zurawski | F01D 25/002 |
| | | | | 123/559.2 |
| 2005/0217266 | A1 | 10/2005 | Noelle | |
| 2008/0110169 | A1 | 5/2008 | Roh | |

FOREIGN PATENT DOCUMENTS

| | | |
|---|---|---|
| DE | 10 2004 058 719 A1 | 6/2006 |
| EP | 1 120 547 A2 | 8/2001 |
| JP | 4-18130 A | 3/1992 |
| JP | 4-18130 B2 | 3/1992 |
| JP | 2003-148107 A | 5/2003 |
| JP | 2004-150400 A | 5/2004 |
| JP | 2005-517113 A | 6/2005 |
| JP | 2010-90714 A | 4/2010 |
| JP | 4545068 B2 | 7/2010 |
| WO | WO 2012/059257 A1 | 5/2012 |

OTHER PUBLICATIONS

Extended European Search Report dated May 11, 2015 issued in corresponding EP Application No. 12834944.6.
Chinese Notification of the Decision to Grant a Patent Right for Patent for Invention, dated Mar. 3, 2016, for Chinese Application No. 201280036532.X, including an English Translation.
International Preliminary Report on Patentability for PCT/JP2012/072889 dated Apr. 10, 2014 with an English translation.
International Search Report for PCT/JP2012/072889 dated Sep. 7, 2012 with an English translation.
Japanese Notice of Allowance for related JP Application No. JP2011-213555 dated Jun. 6, 2014.
Chinese Office Action dated Jun. 18, 2015 in corresponding Chinese Application No. 201280036532 with an English Translation.

* cited by examiner

Related Art

STOPPER STRUCTURE FOR REGULATING OPENING DEGREE OF NOZZLE VANE IN TURBOCHARGER

TECHNICAL FIELD

The present invention relates to a stopper structure for regulating a vane opening for a turbocharger, which is capable of regulating an opening degree of a nozzle vane to a full-open side or a full-close side and adjusting the opening degree of the full-open side and the full-close side.

BACKGROUND ART

In a turbocharger which is used in an engine for vehicles, etc., exhaust gas from the engine, adopted is the configuration in which exhaust gas from the engine fills a scroll formed in a turbine housing, and passes through a plurality of nozzle vanes provided on an inner circumferential side of the scroll to act on a turbine rotor provided on an inner circumferential side of the plurality of nozzle vanes.

The nozzle vanes are incorporated in a variable nozzle mechanism in which an opening angle (a vane angle) in an exhaust gas passage formed between two annular plates can be changed by an actuator.

By this variable nozzle mechanism, opening degrees of the nozzle vanes are changed in accordance with the rotation speed of the engine and hence, the flow rate of the exhaust gas flowing in the exhaust gas passage between the two plates changes, thereby changing the rotation speed of the turbine wheel.

For instance, to accelerate the engine by increasing the rotation speed of the engine from the state where the engine rotation speed is in a low speed range, it is necessary to increase the rotation speed of the turbine wheel by narrowing a passage of the exhaust gas to the state where the opening degree of the nozzle vanes is almost full-closed to raise the flow rate of the exhaust gas.

A stopper structure is need for this type of regulation and adjusting of the opening angle on the full-close side of the nozzle vane.

As the conventional stopper structure for regulating the opening degree of the nozzle vane in the turbocharger, there is a stopper structure illustrated in FIG. 8. This stopper structure for regulating and adjusting the opening degree of the nozzle vane is provided in a bearing housing that rotatably supports a rotation shaft of the turbine wheel constituting a turbocharger.

In FIG. 8, a turbocharger 100 comprises a turbine housing 102 for rotatably accommodating the turbine wheel, a bearing housing 103 attached to the turbine housing 102 and rotatably supporting the rotation shaft of the turbine wheel, and a variable nozzle mechanism 105 for adjusting a flow rate of the exhaust gas entering the turbine wheel by means of a plurality of nozzle vanes.

The variable nozzle mechanism 105 comprises a lever 112 attached to a support 111 so as to adjust the opening degrees of the nozzle vanes collectively, a connection mechanism 114 connected to an end of the lever 112 via a pin 113, an actuator 117 comprising a rod 116 connected to the connection mechanism 114, an extension part 121 integrally formed with the bearing housing 102 to regulate a swing angle of the lever 112, a stopper bolt 122 screwed in this extension part 121, and a rock nut 123 for fixing the stopper bolt 122 to the extension part 121.

The stopper bolt 122 works in the following manner. When the actuator 117 operates and the rod 116 is pulled down obliquely toward a right bottom hand in the drawing, the connection mechanism 114 moves down obliquely toward the right hand side in the drawing and the lever 112 connected to the connection mechanism 114 swings clockwise about the support 111, and the lever 112 comes in contact with a tip of the stopper bolt 122 to regulate further swinging of the lever 112. In other words, the opening degree of the nozzle vanes on the full-close side is regulated.

The opening degree of the nozzle vane on the full-close side can be adjusted by loosening the locknut 123, turning the stopper bolt 122, and advancing or retreating the tip 122a of the stopper bolt 122 with respect to the extension part 121. As a result, the swing angle of the lever 122 with respect to a point where the stopper bolt 122 contacts the tip 122a changes, whereby to change the opening degree of the nozzle vane on the full-close side.

There is also a turbocharger provided with a synchronization mechanism for changing an opening degree of a plurality of nozzle vanes in synchronized manner (see Patent Document 1, for instance).

According to FIG. 1 of Patent Document 1, a synchronization mechanism 6 for rotating a plurality of nozzle vanes synchronously is provided in a turbocharger 1. The synchronization mechanism 6 comprises an actuator 70 serving as its drive source.

CITATION DOCUMENT

Patent Document

[Patent Document 1]
JP 2010-90714 A

SUMMARY

Technical Problem

In the stopper structure illustrated in FIG. 8, a compressor housing is attached to the bearing housing 103 on a front side of the drawing sheet. To adjust the opening degree of the nozzle vane on the full-close side by means of the stopper bolt 122, the stopper bolt 122 and the locknut 123 need to be turned in a deep and narrow space surrounded by large parts such as the bearing housing 103, the actuator 117 and the compressor housing, and it is difficult to perform the adjustment work.

Further, in Patent Document 1, the stopper structure for regulating or adjusting the opening degree of the nozzle vane 53 on the full-close side is not described. Thus, it is difficult to maintain the state where the nozzle vane 53 is slightly open on the full-close side, and it is difficult to improve acceleration performance of the engine from the low speed range.

It is an object of the present invention to provide a stopper structure for regulating an opening degree of a nozzle vane in a turbocharger, whereby an adjustment work for adjusting the opening degree of the nozzle vane on the full-open side or the full-close side can be easily performed.

Solution to Problem

To achieve the above object, the present invention provides an opening degree regulating structure for a nozzle vane in a turbocharger, the structure comprising:

a variable nozzle mechanism which is configured to change an opening degree of the nozzle vane by an actuator so as to change a flow rate of exhaust gas flowing to a turbine wheel; and a stopper which is configured to regulate an opening degree of the nozzle vane on a full-open side or a full-close side and also adjust the opening degree of the nozzle vane on the full-open side or the full-close side, the stopper being constituted by an immovable-side stopper part provided on an actuator bracket for attaching the actuator to a turbocharger body and a movable-side stopper part provided on a movable part that moves with respect to the immovable-side bracket and being contactable with the immovable-side stopper part, the actuator being constituted by an actuator body for generating a drive power and a rod for transmitting the drive power of the actuator body, wherein the movable-side stopper part is provided at the rod which extends from the actuator body to a nozzle vane side and is configured to advance or retreat.

In the case where, for instance, a protruding portion is disposed on the bearing housing and the opening degree of the nozzle vane on the full-close side is regulated at a stopper bolt provided on this protruding part as is conventional, the stopper bolt is disposed in a narrow place near the bearing housing and thus, it is difficult to turn the stopper bolt itself or the lock nut of the stopper bolt when adjusting the opening degree of the nozzle vane on the full-open side by turning the stopper bolt.

In contrast, by providing the movable-side stopper part on the actuator rod as the present invention, it is possible to adjust the opening degree of the nozzle vane on the full-open side or the full-close side easily by the stopper in a wide space away from the bearing housing or the turbine housing.

Therefore, it is possible to shorten the adjustment work time and to achieve adjustment with high accuracy. Further, it is no longer necessary to form a protruding portion for attaching the stopper bolt to the bearing housing. Thus, the bearing housing becomes lightweight and the shape of the bearing housing becomes simpler to facilitate the production.

It is preferable in the present invention that the movable-side stopper part is constituted by a nut provided on the rod, and the immovable-side stopper part is constituted by a heat insulation panel that is attached to the actuator bracket so as to insulate the actuator from heat.

Compared to the case of providing the stopper in a casing such as the bearing housing, the stopper is provided in a steel plate such as the heat insulation panel or the actuator bracket to facilitate the production and also to reduce the production cost.

It is also preferable in the present invention that the heat insulation panel is fastened together with the actuator to the actuator bracket by a bolt for fixing the actuator to the actuator bracket so that the heat insulation panel is attached to the actuator bracket, and a nut receiving part for receiving the nut is formed by a peripheral part of a through-hole that is provided in the heat insulation panel so that the rod passes through the heat insulation panel.

With this configuration, the immovable-side stopper part is formed using the through-hole formed in the heat insulation panel and thus, the simple structure without the need to provide an additional member can be achieved and it can be lightweight and compact.

It is also preferable in the present invention that a tip portion of the rod is connected to the nozzle vane side by a connection mechanism which is adjustable in length, the movable-side stopper part is constituted by an adjusting bolt which is screwed to a body of the connection mechanism so as to be adjustable in length, and the immovable-side stopper part is constituted by a stopper piece which is integrally formed with the actuator bracket.

According to this configuration, the stopper can be disposed in an intermediate portion between the actuator and the nozzle vane side and thus, the adjustment of the opening degree of the nozzle vane on the full-close side can be performed using the stopper in a wide space, thereby improving the workability.

Further, it is preferable in the present invention that a tip portion of the rod is connected to the nozzle vane side by a connection mechanism which is adjustable in length, the movable-side stopper part is constituted by an adjusting bolt which is screwed to the actuator bracket so as to be adjustable in length, and the immovable-side stopper part is constituted by an abutting panel formed on a body of the connection mechanism.

According to such a configuration, the stopper can be disposed in an intermediate portion between the actuator and the nozzle vane side and thus, the adjustment of the opening degree of the nozzle vane on the full-close side can be performed using the stopper in a wide space, thereby improving the workability.

Further, as a bolt, etc. for the stopper is not attached to the protruding part disposed on the movable-side stopper part, the movable-side stopper part becomes lightweight. This improves responsiveness of the nozzle vane to the change in the opening degree when the actuator is operated.

This stopper may be arranged for adjusting the opening degree of the nozzle vane on the full-open side.

Advantageous Effects

According to the present invention as described above, the stopper is constituted by the immovable-side stopper part provided on the actuator bracket for attaching the actuator to the turbocharger body and the movable-side stopper part provided on the movable part that moves with respect to the immovable-side bracket and being contactable with the immovable-side stopper part, and the actuator is constituted by the actuator body for generating the drive power and the rod for transmitting the drive power of the actuator body, and the movable-side stopper part is provided at the rod which extends from the actuator body to a nozzle vane side and is configured to advance or retreat. Therefore, it is possible to adjust the opening degree of the nozzle vane on the full-open side or the full-close side easily by the stopper in a wide space far from the bearing housing or the turbine housing.

Therefore, it is possible to shorten the adjustment work time and to achieve adjustment with high accuracy. Further, it is no longer necessary to form a protruding portion for attaching the stopper bolt to the bearing housing. Thus, the bearing housing becomes lightweight and the shape of the bearing housing becomes simpler to facilitate the production.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

First Embodiment

Figure 1:
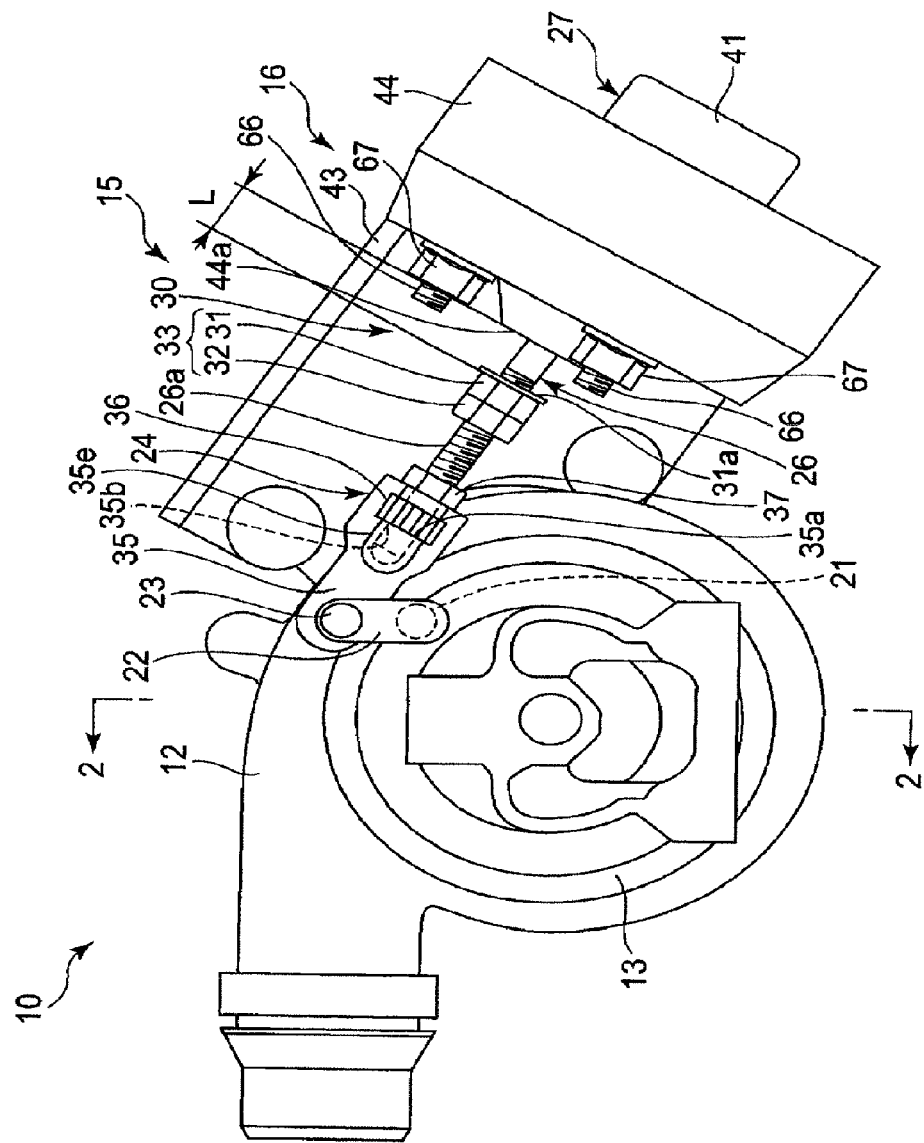
FIG. 1 is a side view of a stopper structure for regulating an opening degree of a nozzle vane for a turbocharger according to a first embodiment of the present invention.

As illustrated in FIG. 1, a turbocharger 10 comprises a turbine housing 12 for accommodating a turbine wheel rotatably, a bearing housing 13 attached to the turbine housing 12 and rotatably supporting a rotation shaft of the turbine wheel 11, a compressor housing (not shown) attached to an opposite side of the bearing housing 13 from the turbine housing 12 (on a front surface side in the drawing), and a variable nozzle mechanism 15 configured to adjust a flow rate of exhaust gas flowing into the turbine wheel by means of a plurality of nozzle vanes.

As for the variable nozzle mechanism 15, an actuator-side assembly 16 is externally arranged. The actuator-side assembly 16 comprises a support shaft 21 which is connected to the nozzle vane side and is supported rotatably by the bearing housing 13, an outer lever 22 connected to the support shaft 21 at one end, a connection mechanism 24 connected to the other end of the outer lever 22 via a connection pin 23 and configured to be adjustable in length, and an actuator 27 having an actuator rod 26 connected to the connection mechanism 24.

A flange nut 31 and a lock nut 32 are mounted to the actuator rod 26. The flange nut 31 constitutes a part of a stopper 30 which is configured to regulate opening degrees of the nozzle vanes on a full-open side and also adjust the opening degrees of the nozzle vanes on a full-open side. The lock nut 32 is mounted to the actuator rod 26 to fix the flange nut 31 to the actuator rod 26.

The flange nut 31 has a flange 31a integrally formed on one side.

These flange nut 31 and lock nut 32 constitute a movable-side stopper part 33.

The connection mechanism 24 comprises a body 35 connected to the outer lever 22 at one end via the connection pin 23, an adjusting nut 36 which is rotatably arranged in a window 35a formed in the body 35, and a lock nut 37 for securing the body 35 to the actuator rod 26 on which a male screw 26a is formed.

The body 35 is formed with a male screw insertion hole 35b in which the male screw 26a is inserted.

The male screw 26a inserted into the male screw insertion hole 35b of the body 35 is screwed to the adjusting nut 36.

Thus, an insertion amount of the male screw 26a in the in the male screw insertion hole 35b of the body 35 is changed by loosening the lock nut 37 and turning the adjusting nut 36. This moves a tip portion of the body, which is a position of the connection pin 23, in the axial direction of the actuator rod 26. As a result, it is possible to change an initial position of the outer lever 22, i.e. an initial angle of the nozzle vanes.

The actuator 27 comprises an actuator body 41 and the actuator rod 26 extending outside from an interior of the actuator body 41.

The actuator body 41 comprises a case 42 (see FIG. 3) and a diaphragm made of rubber (not shown) which is disposed to define two chambers of this case 42. The actuator rod 26 is attached to this diaphragm.

Further, the actuator body 41 is attached to an actuator bracket 43 made of a steel plate which is secured to the turbine housing 12. A heat insulation panel 44 is mounted on the actuator bracket 43 so as to insulate the actuator body 41 from heat radiated from the turbine housing 12.

A nut receiving part 44a is formed by protruding the insulation panel 44. The nut receiving part 44a is an immovable-side stopper part which constitutes a part of the stopper 30. This nut receiving part 44a and the above-described movable-side stopper part 33 (the flange nut 31 and the lock nut 32) together constitute the stopper 30.

Here, L indicates a distance between the nut receiving part 44a of the heat insulation panel and the flange 31a of the flange nut 31. It is possible to adjust the minimum opening degree of the nozzle vanes as detailed later by loosening the lock nut 32 and changing the distance L by rotating the flange nut 31.

Figure 2:
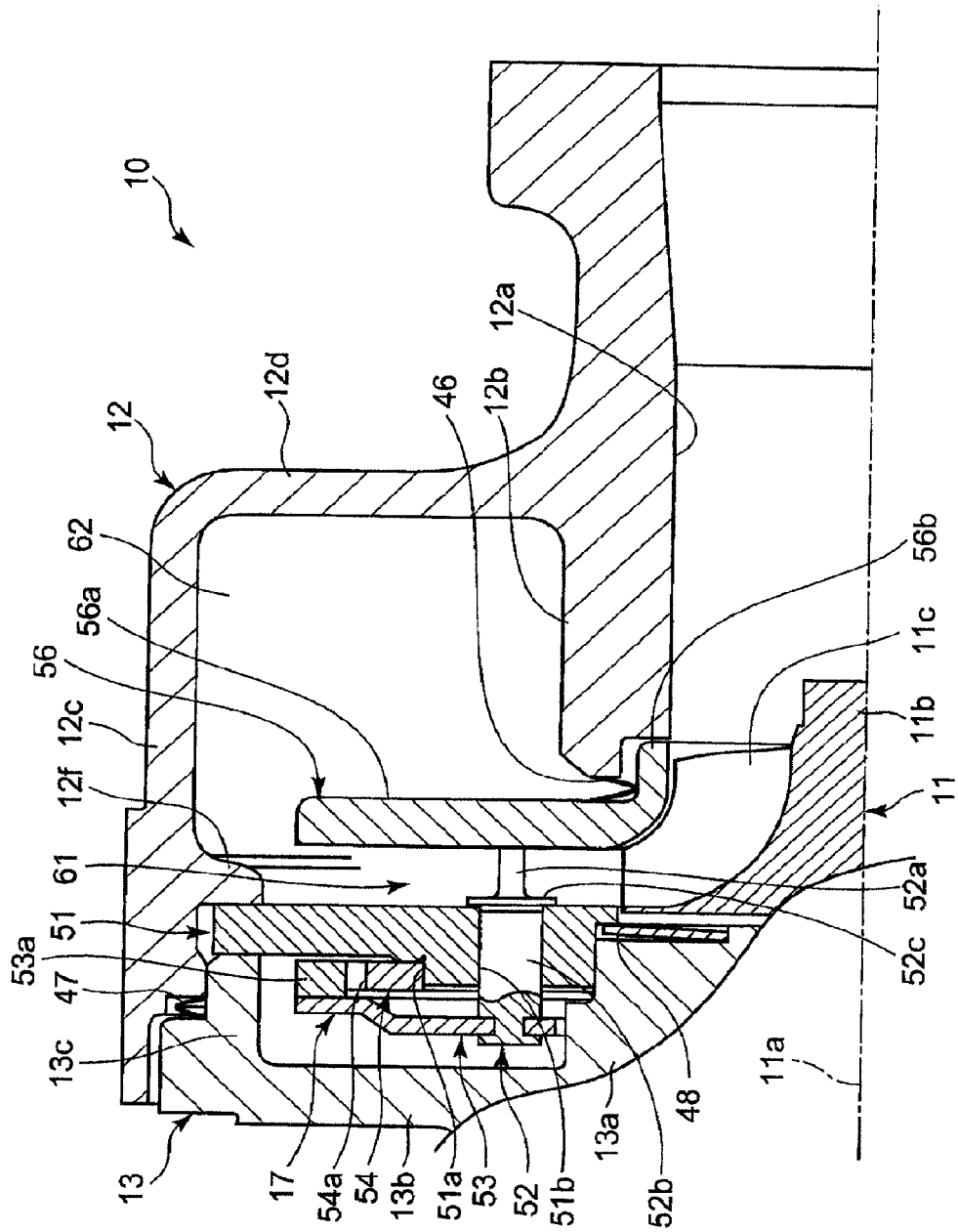
FIG. 2 is a cross-sectional view along line 2-2 of FIG. 1

As illustrated in FIG. 2, the turbocharger 10 comprises a turbine housing 12 for accommodating a turbine wheel rotatably, a bearing housing 13 attached next to the turbine housing 12 and rotatably supporting a rotation shaft of the turbine wheel 11 (the rotation shaft is not shown and 11a is an axis of the rotation shaft of the turbine wheel 11), a nozzle assembly 17 disposed between the turbine housing 12 and the bearing housing 13 on their inner side to adjust the flow speed of the exhaust gas flowing into the turbine wheel 11. FIG. 2 also illustrates a seal ring 46 for sealing between the turbine housing 12 and the nozzle assembly 17, a seal ring 47 for sealing between the turbine housing 12 and the bearing housing 13, a disc spring back plate 48 for sealing between the bearing housing 13 and the nozzle assembly 17 (specifically, the nozzle mount 51).

The turbine wheel 11 comprises a hub 11b disposed at one end of a rotation shaft and a plurality of turbine blades 11c disposed on an outer peripheral surface of the hub 11b.

The turbine housing 12 comprises a inner peripheral wall 12b of a tubular shape which forms an exhaust gas discharge port 12a disposed on a downstream side of the turbine wheel 11 in the flow direction of the exhaust gas, an outer peripheral wall 12c of a tubular shape formed outside the inner peripheral wall 12b in the radial direction to surround the inner peripheral wall 12b, and an annular wall 12d extending outward in the radial direction from a midsection of the inner peripheral wall 12b to an end of the outer peripheral wall 12c.

The bearing housing 13 comprises an inner peripheral wall 13a of a tubular shape for supporting the rotation shaft of the turbine wheel 11, an annular wall 13b rising outward in the radial direction from the inner peripheral wall 13a, and an outer peripheral wall 13c of a tubular shape continuing to an outer peripheral edge of the annular wall 13b.

The nozzle assembly 17 comprises an annular nozzle mount 51 sandwiched and secured between an inward flange 12f formed on the outer peripheral wall 12c of the turbine housing 12 and the outer peripheral wall 13c of the bearing housing 13, a plurality of nozzles 52 rotatably attached to the nozzle mount 51 and aligned in the circumferential direction, a plurality of lever plates 53 having ends attached to respective ends of the nozzles 52, a drive ring 54 having grooves 54a on an outer peripheral part so that the grooves 54a engage with engagement projections 53a disposed at other ends of the lever plates 53, respectively, and being rotatably fitted at its inner peripheral part to a small-diameter part 51a of the nozzle mount 51, and an annular nozzle plate 56 attached to the nozzle mount 51 such as to sandwich nozzle vanes 52a constituting the nozzles 52 between the nozzle mount 51 and the nozzle plate 56.

The above drive ring 54 has one notch formed in the outer peripheral part. In this notch, an arm provided at an inner end of the support shaft 21 (see FIG. 1) engages.

The above actuator-side assembly 16 (see FIG. 1) and the nozzle assembly 17 constitute the variable nozzle mechanism 15.

By driving the actuator 27 (see FIG. 1) and rotating the drive ring 54, each of the lever plates 53 is caused to swing in a constant direction relative to the nozzle mount 51, and the angle of the nozzle vane 52a is changed by this rotation of the nozzle 52.

The nozzle 52 is a member integrally formed by the nozzle vane 52a, a nozzle shaft 52b constituting a rotary shaft of the nozzle vane 52a, and a flange 52c for regulating a position of the nozzle 52 in the axial direction. The nozzle shaft 52b is rotatably fitted in a bearing hole 51b formed in the nozzle mount 51. To an end of the nozzle shaft 52b, the lever plate 53 is fixed by caulking.

The nozzle plate 56 is an integrally molded body including an annular plate part 56a and a tubular part 56b. The tubular part 56b extends from an inner peripheral end of the plate part 56a in the axial direction of the turbine wheel 11 along an outer profile of the turbine blade 11c of the turbine wheel 11 while keeping a certain clearance from the outer profile of the turbine blade 11c.

The nozzle mount 51 and the nozzle plate 56 together form an exhaust gas passage 61 where the exhaust gas flows. This exhaust gas passage 61 is a midway passage for the exhaust gas between a scroll 62 of a spiral shape formed in the turbine housing 12 and the turbine wheel 11.

Therefore, by changing the vane angle of the nozzle vane 52a disposed in the exhaust gas passage 61 using the variable nozzle mechanism 15, it is possible to change the flow rate of the exhaust gas acting in the turbine wheel 11, and hence control a supercharging pressure of a compressor provided in the turbocharger 10.

Figure 3:
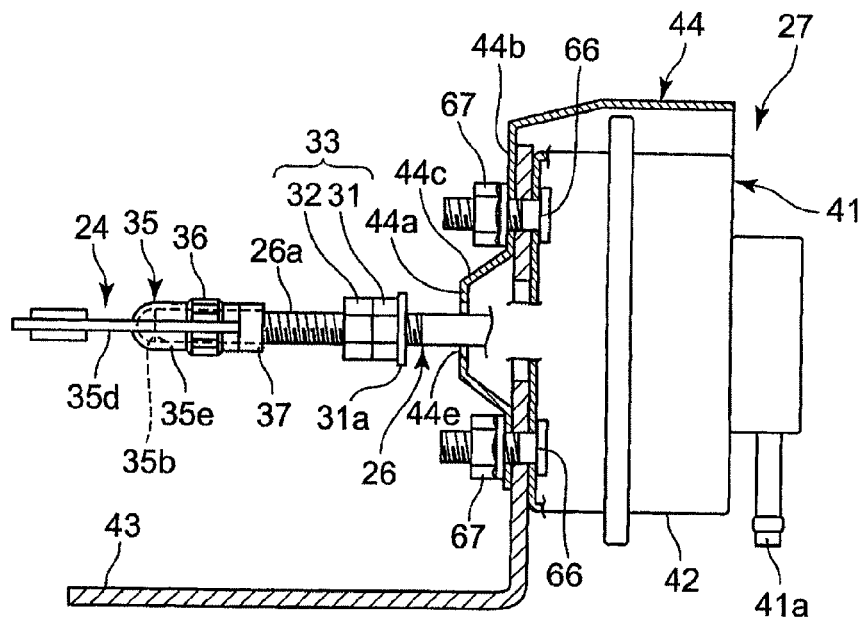
FIG. 3 is a cross-sectional view of a part of a variable nozzle mechanism according to the first embodiment of the present invention.

As illustrated in FIG. 3, the body 35 of the connection mechanism 24 comprises a flat panel portion 35d which is formed into a thin plate shape and is connected to the connection pin 23 (see FIG. 1), and a cylindrical portion 35e bulging in a cylindrical shape from the flat panel portion 35d. The flat panel portion 35d and the cylindrical portion 35e are integrally formed. The male screw insertion hole 35b is formed in the cylindrical portion 35e.

The actuator bracket 43 and the heat insulation panel 44 are fastened together to the case 42 provided in the actuator body 41 of the actuator 27 by means of bolts 66, 66 and nuts 67, 67. A negative pressure inlet 41a is provided to feed a negative pressure into the actuator body 41.

The heat insulation panel 44 comprises a base plate part 44b adjacent to the actuator bracket 43, an annular taper part 44c erecting from the base plate part 44b, and the flat nut receiving part 44a formed at a tip portion of the taper part 44c.

The nut receiving part 44a is formed with a through-hole 44e through which the actuator rod 26 passes and forms a flat part perpendicular to the actuator rod 26.

The effect of the above-described stopper 30 is now described.

Figure 4:
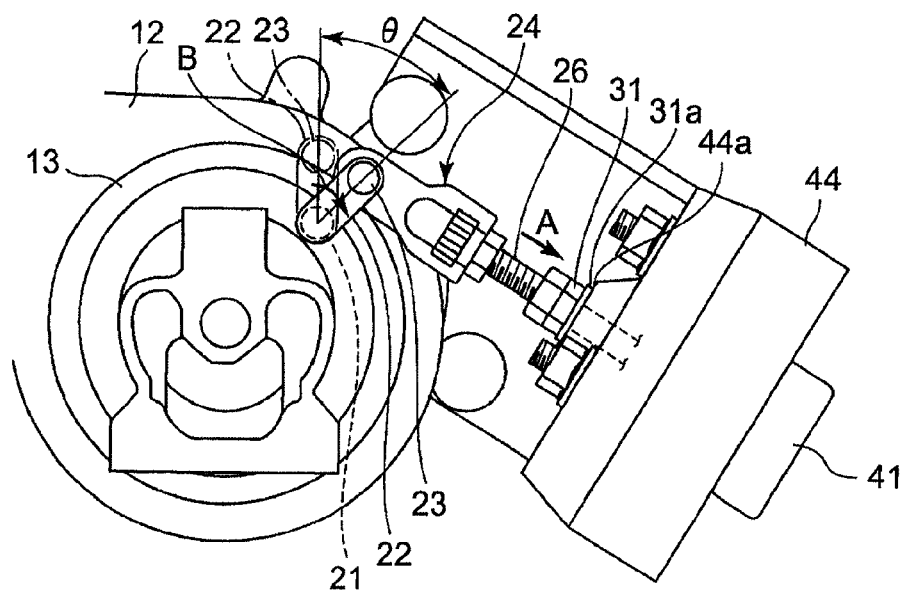
FIG. 4 is an explanatory drawing of a function of the stopper structure for regulating the opening degree of the nozzle vane according to the first embodiment of the present invention.

In the state illustrated in FIG. 1, when the negative pressure introduced into the actuator body 41, the diaphragm in the actuator body 41 moves. In response to this, the actuator rod 26 attached to the diaphragm is pulled in the direction of arrow A as illustrated in FIG. 4, and the flange 31a of the flange nut 31 hits the nut receiving part 44a of the heat insulation panel 44, thereby stopping the movement of the actuator rod 26.

As a result, the connecting pin 23 and the connection mechanism 24 move, and the outer lever 22, as indicated by arrow B, is swung around the support shaft 21 by an angle θ to a position illustrated by a solid line from a position illustrated by a broken line. This causes the support shaft 21 to rotate by an angle θ. In response to this, in FIG. 2, the drive ring 54 of the nozzle assembly 17 disposed inside turbine housing and the bearing housing 13 is rotated, and hence each of the lever plates 53 is swung simultaneously and each of the nozzles 52 is rotated, thereby reducing the opening degree of each of the nozzle vanes 52a.

Figure 5A:
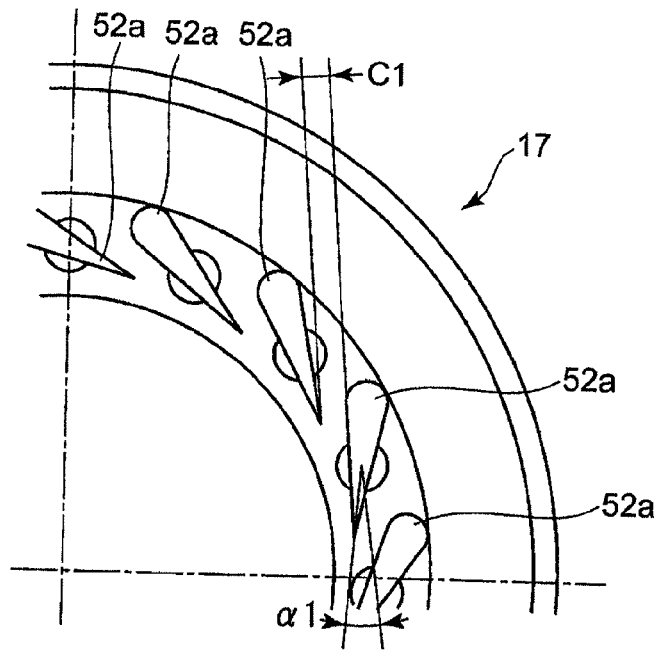
FIG. 5A is an explanatory drawing of the state before operation of an actuator, where an opening degree of the nozzle vane is large.

As illustrated in FIG. 5A, before the actuator is in operation, each of the nozzle vanes 52a is in the state where the opening degree of the nozzle vane 52 is large (an angle α1 in the drawing indicates an opening degree (vane angle) from zero at which the nozzle vane 52a is completely closed). A passage area between the adjacent nozzle vanes 52a is large (C1 in the drawing is a clearance between the nozzle vanes 52a).

Figure 5B:
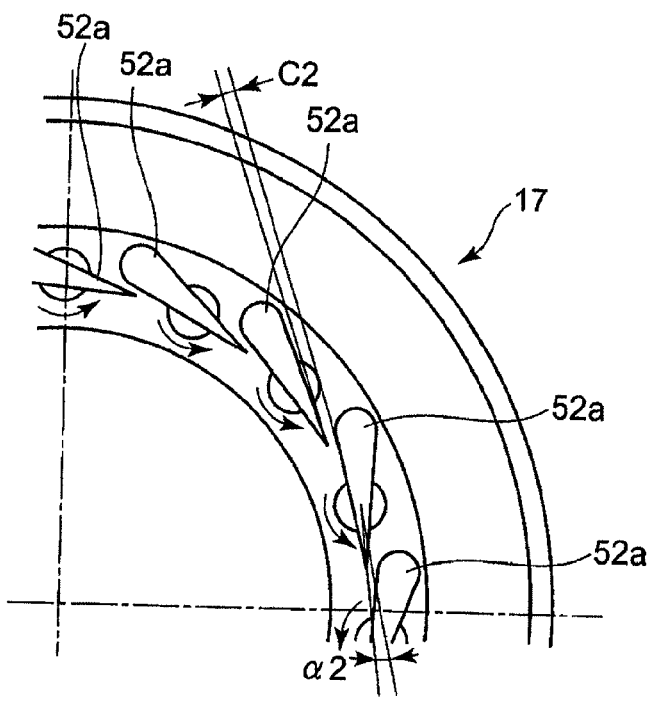
FIG. 5B is an explanatory drawing of the state after operation of the actuator, where the opening degree of the nozzle vane is regulated on a full-closed side.

When the actuator is in operation, each of the nozzle vanes 52a is rotated counterclockwise as indicated by arrows from the state of FIG. 5A to FIG. 5B, and the opening degree of each of the nozzle vanes 52a becomes small to almost fully-closed state (an angle α2 in the drawing indicates an opening degree (vane angle) from zero at which the nozzle vane 52a is completely closed and α2<α1). A passage area between the adjacent nozzle vanes 52a is minimized (C2 in the drawing is a clearance between the nozzle vanes 52a and C2<C1). As a result, the flow rate of the exhaust gas flowing through between the adjacent nozzle vanes 52a increases, and hence the rotation speed of the turbine wheel rises.

Second Embodiment

In the second embodiment, the same reference numerals are used for the same configuration as the first embodiment, and the detailed description thereof is omitted.

Figure 6:
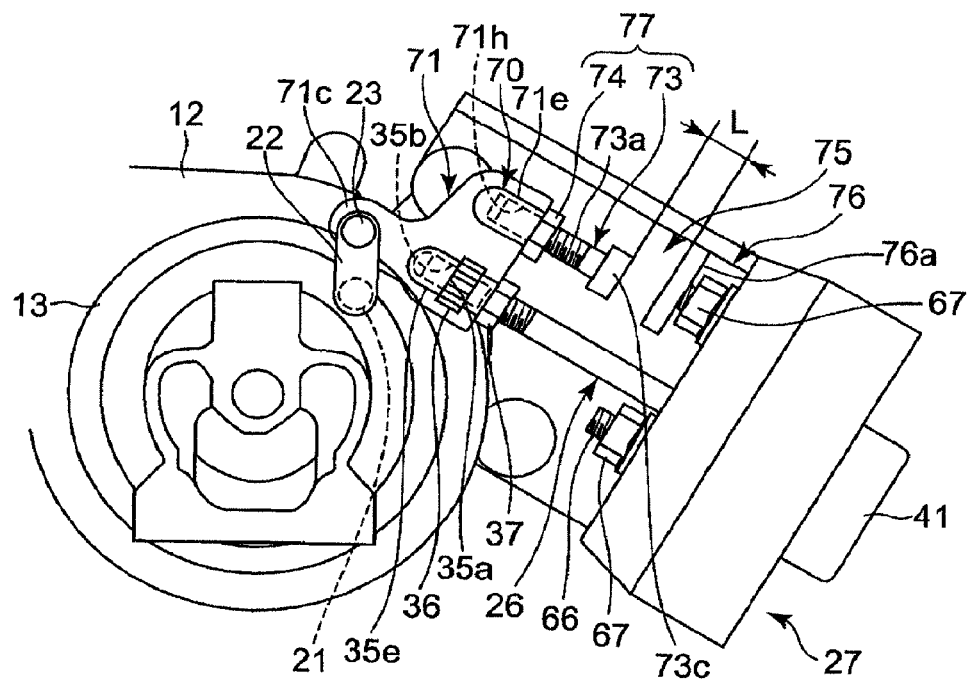
FIG. 6 is a side view of an opening degree regulating structure for a nozzle vane according to a second embodiment of the present invention.

As illustrated in FIG. 6, a connection mechanism 70 for connecting the connection pin 23 to the actuator rod 26 comprises a body 71 connected to the outer lever 22 at one end via the connection pin 23, an adjusting nut 36 which is rotatably arranged in a window 35a formed in the body 71, a lock nut 37 for securing the body 71 to the actuator rod 26, and a stopper bolt 73 which is screwed to the body to be disposed in parallel to the actuator rod 26, and a lock nut 74 for securing the stopper bolt 73 to the body 71.

The stopper bolt 73 and the lock nut 74 constitute a movable-side stopper part 77 which is a part of a stopper 75 for regulating the opening degrees of the nozzle vanes on a full-close side and also adjusting the opening degrees of the nozzle vanes on the full-close side.

The body 71 is an integral member comprising a flat panel portion 71c which is formed into a thin plate shape and is connected to the connection pin 23, and two cylindrical portions 35e, 71e bulging in a cylindrical shape from the flat panel portion 71c to be disposed parallel to each other. The male screw insertion hole 35b is formed in the cylindrical portion 35e so that the male screw 26a is inserted in the male screw insertion hole 35b, and a female screw 71h is formed in the cylindrical portion 71e so that a male screw 73a of the stopper bolt 73 is screwed in the female screw 71h.

An actuator bracket 76 is attached to the turbine housing 12 to support the actuator body 41. The actuator bracket 76 is integrally formed with a stopper piece 76a at a position facing a head portion 73c of the stopper bolt 73.

The stopper piece 76a is an immovable-side stopper part constituting a part of the stopper 75 for regulating the opening degrees of the nozzle vanes on the full-close side and also adjusting the opening degrees of the nozzle vanes on the full-close side.

When the actuator 27 is operated and the actuator rod 26 is pulled into the actuator body 41, the head 73c of the stopper bolt 73 of the connection mechanism 70 hits the stopper piece 76a.

The above-described movable-side stopper part 77 and the stopper piece 76a constitute the stopper 75. By abutting the head 73c of the stopper bolt 73 to the stopper piece 76a, the minimum opening degree of the nozzle vane 52a (see FIG. 5B) can be regulated.

Here, L indicates a distance between the head 73c of the stopper bolt 73 and the stopper piece 76a. It is possible to adjust the minimum opening degree of the nozzle vanes, as illustrated in FIG. 5A and FIG. 5B, by loosening the lock nut 74 and changing the distance L by turning the stopper bolt 73.

Third Embodiment

In the second embodiment, the same reference numerals are used for the same configuration as the first embodiment and the second embodiment, and the detailed description thereof is omitted.

Figure 7:
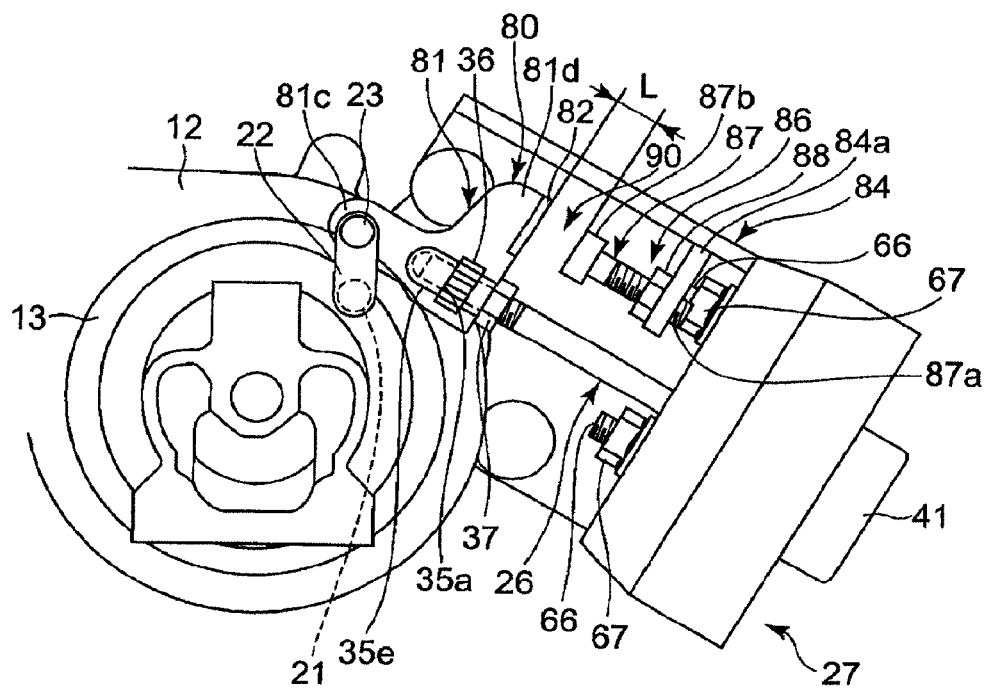
FIG. 7 is a side view of an opening degree regulating structure for a nozzle vane according to a third embodiment of the present invention.
Figure 8:
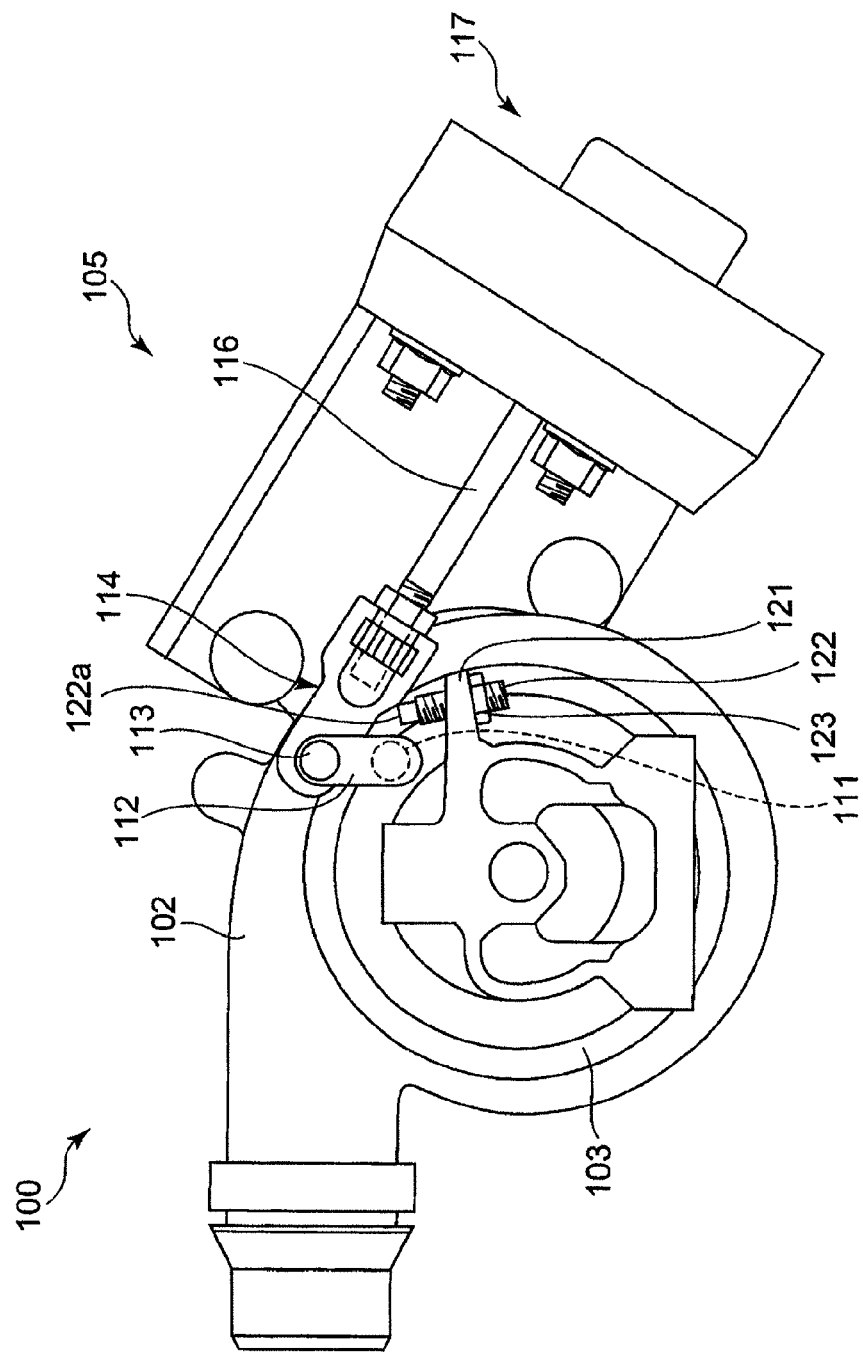
FIG. 8 is a side view of an opening degree regulating structure for a nozzle vane according to related art.

As illustrated in FIG. 7, a connection mechanism 80 for connecting the connection pin 23 to the actuator rod 26 comprises a body 81 connected to the outer lever 22 at one end via the connection pin 23, the adjusting nut 36 which is rotatably arranged in the window 35a formed in the body 81, and the lock nut 37 for securing the body 81 to the actuator rod 26.

The body 81 comprises a flat panel portion 81c which is formed into a thin plate shape and is connected to the connection pin 23, an abutting panel 82 provided on a side protruding portion 81d formed in the flat panel portion 81c, and a cylindrical portion 35e integrally bulging in a cylindrical shape from the flat panel portions 81c.

The side protruding portion 81d is a movable-side stopper part which is a part of a stopper 90 for regulating the opening degrees of the nozzle vanes on a full-close side and also adjusting the opening degrees of the nozzle vanes on the full-close side.

An actuator bracket 84 is attached to the turbine housing 12 to support the actuator body 41. The actuator bracket 84 is integrally formed with a protruding piece 84a at a position facing the abutting panel 82 of the connection mechanism 80. In this protruding piece 84a, a stopper part 86 is provided so that the stopper part 86 is abutted to the abutting panel 82 to regulate the movement of the connection mechanism 80.

The stopper part 86 comprises a stopper bolt 87 and a lock nut 88. The stopper bolt 87 has a male screw 87a screwed in a female screw formed in the protruding piece 84a, and a head 87b arranged to oppose the abutting panel 82. The lock nut 88 secures the stopper bolt 87 to the protruding piece 84a. The stopper part 86 is an immovable-side stopper part constituting a part of the stopper 90 for regulating the opening degrees of the nozzle vanes on the full-close side and also adjusting the opening degrees of the nozzle vanes on the full-close side.

The abutting panel 82 where the head 87b of the stopper bolt 87 hits may be made of steel plate having higher hardness than the casting when the body 81 is made of casting, for instance, so as to suppress frictional wear of the abutting panel 82 from contact with the head 87b.

The above-described side protruding portion 81d and the stopper part 86 constitute the stopper 90.

When the actuator 27 is operated and the actuator rod 26 is pulled into the actuator body 81, the abutting panel 82 of the connection mechanism 80 hits the head 87b of the stopper bolt 87, thereby regulating the minim opening degree of the nozzle vane 52a (see FIG. 5A).

Here, L indicates a distance between the abutting panel 82 of the connection mechanism 80 and the head 87 of the stopper bolt 87. It is possible to adjust the minimum opening degree of the nozzle vanes, as illustrated in FIG. 5A and FIG. 5B, by loosening the lock nut 88 and changing the distance L by turning the stopper bolt 87.

Further, in the first embodiment, the nut receiving part 44a of the heat insulation panel 44 serves as the immovable-side stopper part as illustrated in FIG. 3. This is, however, not restrictive and a protruding part may be formed on the actuator bracket 43 to serve as the immovable-side stopper part.

Furthermore, the first to third embodiments are intended to regulate the opening degree on the full-close side in the state where the opening degree of the vane is fully closed, when the actuator rod becomes shorter during its stroke. This is, however, not restrictive and it may be configured to regulate the opening degree on the full-open side in the state where the opening degree of the vane is fully open, when the actuator rod becomes longer during its stroke.

Specifically, in the first embodiment, the movable-side stopper part 33 may be positioned on the opposite side of the immovable-side stopper part 44a of the heat insulation panel 44 (the right side of the immovable-side stopper part 44a in FIG. 3), and in the second embodiment, the positional relationship between the movable stopper part 77 and the stopper piece 76a (see FIG. 6) may be reversed, and further in the third embodiment, the positional relationship between the stopper part 86 and the abutting panel 82 (see FIG. 7) may be reversed, so as to regulate the opening degree on the full-open side.

INDUSTRIAL APPLICABILITY

The present invention is suitable for a turbocharger having a rod in an actuator as a driving source of the variable nozzle mechanism.

The invention claimed is:
1. An opening degree regulating structure for a nozzle vane in a turbocharger, the structure comprising:
a variable nozzle mechanism which is configured to change an opening degree of the nozzle vane by an actuator so as to change a flow rate of exhaust gas flowing to a turbine wheel; and a stopper which is configured to regulate an opening degree of the nozzle vane on a full-open side or a full-close side and also adjust the opening degree of the nozzle vane on the full-open side or the full-close side, the stopper being constituted by an immovable-side stopper part provided on an actuator bracket for attaching the actuator to a turbocharger body and a movable-side stopper part provided on a movable part that moves with respect to the immovable-side stopper part and being contactable with the immovable-side stopper part, the actuator being constituted by an actuator body for generating a drive power and an actuator rod for transmitting the drive power of the actuator body, wherein the movable-side stopper part is provided at the actuator rod which extends from the actuator body to a nozzle vane side and which is configured to advance or retreat, and wherein the movable-side stopper part is constituted by a nut provided on the actuator rod.

2. The opening degree regulating structure for the nozzle vane in the turbocharger according to claim 1, wherein the immovable-side stopper part is constituted by a heat insulation panel that is attached to the actuator bracket so as to insulate the actuator from heat.

3. The opening degree regulating structure for the nozzle vane in the turbocharger according to claim 2, wherein the heat insulation panel is fastened together with the actuator to the actuator bracket by a bolt for fixing the actuator to the actuator bracket so that the heat insulation panel is attached to the actuator bracket, and a nut receiving part for receiving the nut is formed by a peripheral part of a through-hole that is provided in the heat insulation panel so that the actuator rod passes through the heat insulation panel.

4. An opening degree regulating structure for a nozzle vane in a turbocharger, the structure comprising:

a variable nozzle mechanism which is configured to change an opening degree of the nozzle vane by an actuator so as to change a flow rate of exhaust gas flowing to a turbine wheel; and a stopper which is configured to regulate an opening degree of the nozzle vane on a full-open side or a full-close side and also adjust the opening degree of the nozzle vane on the full-open side or the full-close side, the stopper being constituted by a stopper piece which is integrally formed with an actuator bracket for attaching the actuator to a turbocharger body and a movable-side stopper part provided on a movable part that moves with respect to the stopper piece and being contactable with the stopper piece, the actuator being constituted by an actuator body for generating a drive power and a actuator rod for transmitting the drive power of the actuator body, wherein the movable-side stopper part includes a stopper bolt, a length of the stopper being adjustable, screwed to a body which is secured to the actuator rod.

5. The opening degree regulating structure for a nozzle vane in a turbocharger according to claim 4, wherein the movable-side stopper part is constituted by the stopper bolt which is screwed to the body to be disposed in parallel to the actuator rod and a lock nut for securing the stopper bolt to the body.

6. An opening degree regulating structure for a nozzle vane in a turbocharger, the structure comprising:

a variable nozzle mechanism which is configured to change an opening degree of the nozzle vane by an actuator so as to change a flow rate of exhaust gas flowing to a turbine wheel; and a stopper which is configured to regulate an opening degree of the nozzle vane on a full-open side or a full-close side and also adjust the opening degree of the nozzle vane on the full-open side or the full-close side, the stopper comprising a stopper bolt which is screwed to a protruding piece formed integrally on an actuator bracket for attaching the actuator to a turbocharger body and a abutting panel where the stopper bolt hits, the actuator being constituted by an actuator body for generating a drive power and an actuator rod for transmitting the drive power of the actuator body, wherein the abutting panel is formed on a body which is secured to the actuator rod and is provided on a side protruding portion formed in a flat panel portion in the body, the flat panel portion being connected to a connection pin.

7. The opening degree regulating structure for a nozzle vane in a turbocharger according to claim 6, wherein the abutting panel is made of material having a hardness higher than a hardness of the body.

* * * * *